United States Patent [19]

Hege

[11] 4,166,510

[45] Sep. 4, 1979

[54] CONTINUOUS AUTOMATIC WEIGHING CONVEYOR FOR FLOWABLE SOLIDS

[76] Inventor: Paul H. Hege, Rte. 2, Box 353, Hagerstown, Md. 21740

[21] Appl. No.: 857,416

[22] Filed: Dec. 5, 1977

[51] Int. Cl.² ............................................. G01G 11/14
[52] U.S. Cl. ..................................... 177/16; 235/61 C
[58] Field of Search ........................... 177/16; 235/61 C

[56] References Cited

U.S. PATENT DOCUMENTS

| 1,032,183 | 7/1912 | Buchan | 235/61 C |
| 1,073,070 | 9/1913 | Hebden | 177/16 |
| 1,160,762 | 11/1915 | Richardson | 177/16 |
| 1,237,332 | 8/1917 | Hebden | 177/16 |

*Primary Examiner*—Joseph W. Hartary
*Attorney, Agent, or Firm*—B. P. Fishburne, Jr

[57] ABSTRACT

Flowable solids are continuously and accurately weighed during transport to a collection or discharge point. A counterweight pivoted conveyor carries a rotating disc at its discharge end, one face of which frictionally engages a relatively stationary comparatively small diameter wheel having a plane of rotation at right angles to the plane of the disc. The disc rises and falls with the pivotal conveyor in response to varying amounts of material on the conveyor, thereby changing the effective radius of the disc relative to the wheel. The wheel activates a counter once during each rotation thereof to register a unit of weight in the counter. The structure is useful in agriculture or industry.

4 Claims, 5 Drawing Figures

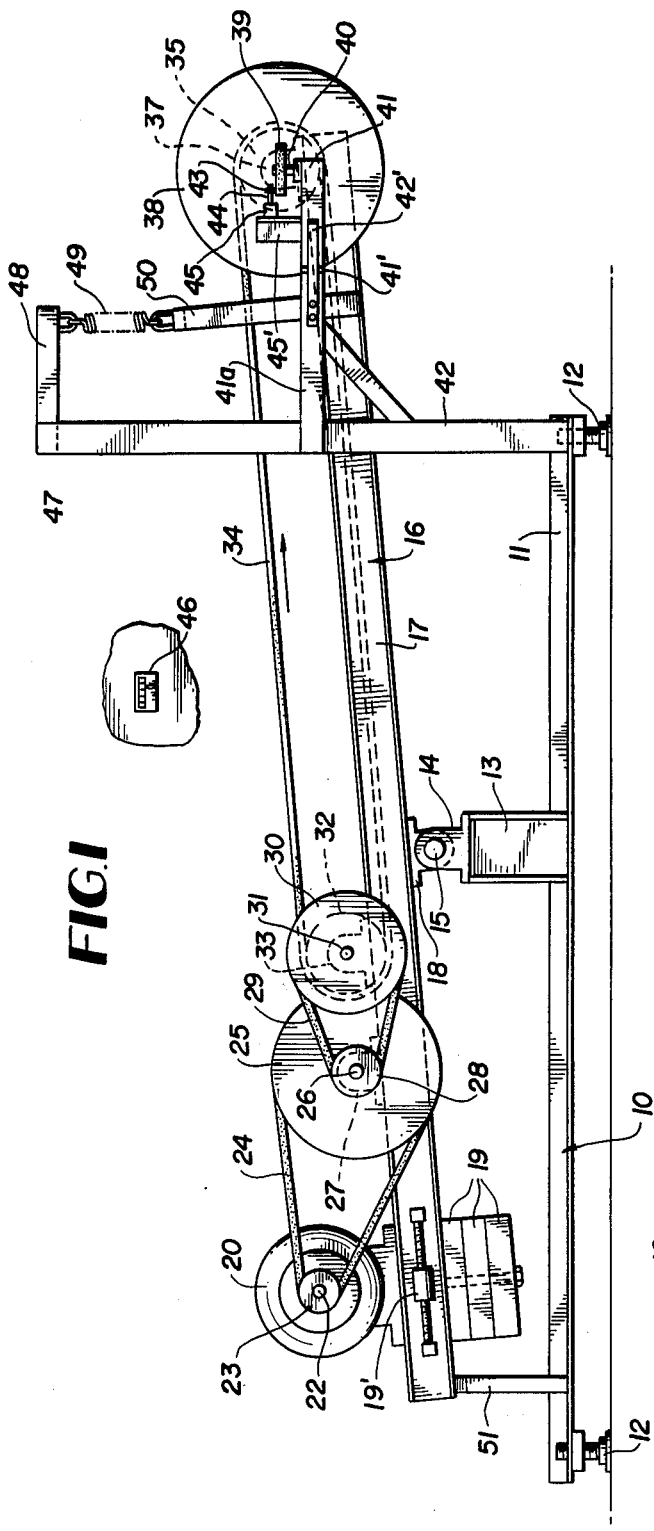
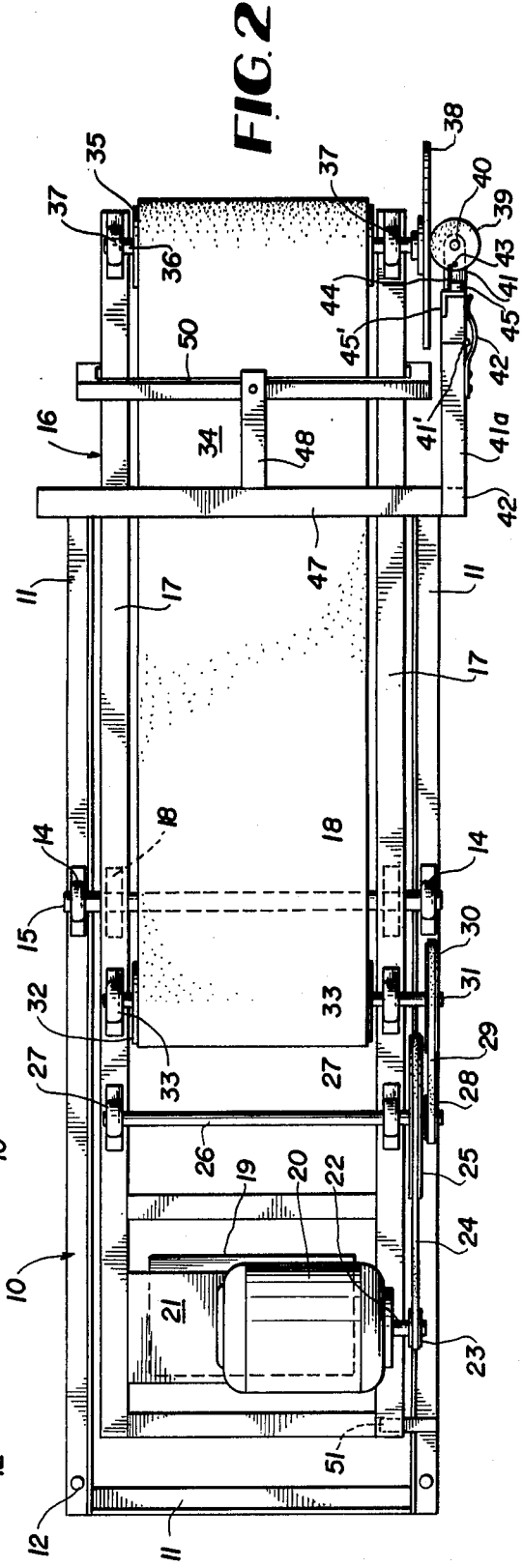

CONTINUOUS AUTOMATIC WEIGHING CONVEYOR FOR FLOWABLE SOLIDS

BACKGROUND OF THE INVENTION

Continuous and automatic conveyors are known in the prior art including conveyors for flowable aggregates and solids. Generally speaking, the prior art weighing conveyors are large industrial installations which include sophisticated and costly components, either electrical or mechanical in nature. Because of their high cost, the prior art devices are not suitable for use by farmers or in small industrial operations where the more expensive equipment cannot be justified economically. Some examples of the known patented prior art are contained in the following U.S. Pat. Nos: 1,032,183; 3,070,214; 1,751,898; 3,339,650; 2,630,312; 3,478,830; 2,882,036; 3,718,197.

With the above drawbacks of the prior art in mind, it is the objective of this invention to satisfy the need of the art for a wholly practical and reliable continuous automatic weighing conveyor for flowable solids which is particularly useful to farmers, and also finding utility in light industry where the heavier and much more costly equipment cannot be utilized.

A further object is to provide a weighing conveyor which is virtually free of the necessity for adjustment once properly set up, and which can have its capacity increased merely by increasing the speed of the drive unit so as to operate the material conveyor at an increased rate.

Another object is to provide a continuous weighing conveyor which is not sensitive to belt slippage and which can operate in conjunction with either an electrical or mechanical counter for handling a wide range of dry flowable solids, such as silage, grain, sand, coal or the like. The length of the conveyor can be changed to meet the needs of a particular application, as will be made clear during the course of the following description.

Other features and advantages of the invention will become apparent in the detailed description of this application.

BRIEF DESCRIPTION OF THE DRAWINGS

FIG. 1 is a side elevation showing one embodiment of a continuous automatic weighing conveyor for flowable solids according to the invention.

FIG. 2 is a plan view of the invention.

DETAILED DESCRIPTION

Figure 3:
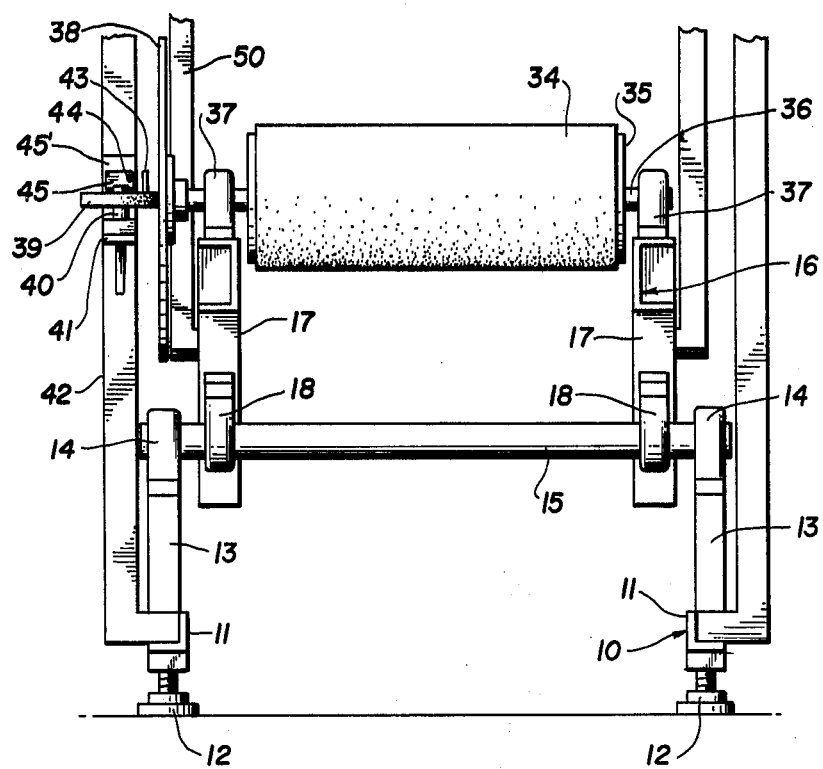
FIG. 3 is an end elevational view of the invention.

Referring to the drawings in detail wherein like numerals designate like parts, the numeral 10 designates a low horizontal base frame which may be conveniently constructed from angle bars 11, and preferably provided with adjustable support feet 12 for approximate leveling of the machine on uneven surface. Near the longitudinal center of the frame, a pair of rigid support posts 13 rise from the opposite sides of the frame, FIG. 3, and are provided at their tops with bearings 14 within which is journaled a transverse horizontal support shaft 15 for a vertically swingable rigid frame 16 of the continuous weighing conveyor. The frame 16 comprises sturdy side channel members 17 which are equipped somewhat rearwardly of their longitudinal centers with bearings 18, rockably mounted on the transverse shaft 15 inwardly of the bearings 14. The length of the conveyor frame 16 can be varied to suit individual installations and to provide the necessary distance between the deposit and delivery points for the material which is being conveyed and weighed. In this connection, the drawings are illustrative only and should not be taken in a limiting sense.

As shown in FIG. 1, the frame 16 extends some distances fore and aft of the pivot shaft 15, and near the rear end of the frame suitable counterweights 19 are bolted or otherwise rigidly secured to the bottom of the frame. To allow fine balancing of the pivoted conveyor, a small adjustable weight 19' may be provided as illustrated in FIG. 1. Near and above the counterweights 19 an electric motor 20 for the conveyor is mounted on a suitable platform 21 carried by the frame 16. The armature shaft 22 of the motor 20 extends transversely of the frame 16, and near one side of the frame carries a drive sheave 23 coupled by a belt 24 to a larger pulley 25, mounted on one end of a transverse horizontal countershaft 26, supported in bearings 27 on the frame members 17. The countershaft 26 at one end carries a smaller pulley 28 outwardly of the pulley 25, and the pulley 28 is drivingly connected by a belt 29 with another pulley 30 on the transverse horizontal shaft 31 of a rear conveyor roll 32. The shaft 31 is supported by bearings 33 mounted on the frame members 17.

A conveyor belt 34 for flowable solids engages the rear powered roll 32 and also engages a forward end idler roll 35 having its transverse shaft 36 held in bearing 37 on the frame members 17 at their forward ends. The position directly above the pivot shaft 15 of the conveyor is the flowable solids deposit or input point of the machine, while the material delivery point or discharge point is at the forward conveyor roll 35. The linear speed of the belt 34 in the direction of the arrow, FIG. 1, can be changed to meet particular needs by simply changing the size of the motor pulley 23 or by using variable speed pulleys in the drive system. In some cases, a variable speed motor rather than a constant speed motor can be employed. The capacity of the weighing conveyor is adjusted merely by changing the speed of the conveyor belt and without the necessity for any other adjustments in the apparatus.

While a belt conveyor has been shown for simplicity, it should be understood that other forms of conveyor elements such as chain and slat or flighted endless conveyor elements may be utilized.

At the forward end of the pivoted frame 16, a comparatively large diameter flat vertical disc 38 is bodily mounted on the front roll shaft 36 of the conveyor to rotate therewith, the disc 38 being spaced laterally outwardly of one frame member 17, as shown in the drawings. A coacting preferably rubber-tired wheel 39 of considerably smaller diameter than the disc 38 is supported for free rotation on a small vertical support shaft 40 while being held in frictional contact with the outer face of the disc 38 in a plane at right angles to the plane of the disc. The shaft 40 of the friction wheel 39 is mounted on a horizontally swingable support bracket 41 having a vertical axis hinge connection at 41' to a rigid horizontal support arm 41a carried by and extending forwardly of an upright member 42 rising from one of the base frame bars 11. The upright member 42, FIG. 3, is positioned outwardly of the disc 38 and outwardly of the adjacent post 13. A leaf spring 42' attached to the rigid arm 41a bears against the outer side of horizontally swingable bracket 41 and urges the wheel 39 into firm frictional contact with the disc 38. Other spring arrangements for this purpose may be utilized, such as a torsion spring on the hinge connection 41' or mounting the wheel 39 directly on a leaf spring member which is biased toward the disc 38.

The wheel 39 carries an upstanding pin 43 near its periphery and in the rotational path of movement of this pin is an actuator element 44 of a microswitch 45 fixed to a support bracket 45' on the swingable bracket 41. Electrically connected with the microswitch 45 in a conventional manner is a digital counter 46 which may be mounted at a convenient control center on or remote from the machine. In lieu of the electrical counter 46 and microswitch 45, a mechanical counter can be placed at the location of the switch 45 with its digit actuator in the path of movement of the pin 43 so that the counter will be tripped once during each revolution of the wheel 39.

The upright 42, FIG. 1, extends well above the top of the conveyor at one side thereof and a transverse horizontal beam 47 extending from the top of the upright 42 supports a center longitudinal rigid arm 48 to which a vertical rectractile spring 49 is attached and extends therebelow. The spring 49 has its lower end connected to a cradle or yoke 50 which in turn is secured to the pivoted frame 16 of the conveyor somewhat rearwardly of the forward end of the frame. The spring 49 is used to control the descent of the discharge end of the conveyor by counter-balancing the additional weight of any increasing amount of material as it is added to the conveyor belt. Other forms of retarder means may be used instead of the spring arrangement shown. Preferably, a positive stop member 51 rising from one of the base frame members 11 limits the downward swinging movement of the rear end of conveyor frame 16. The stop member 51 is not essential to the operation of the invention and may be omitted, if preferred.

Figure 4:
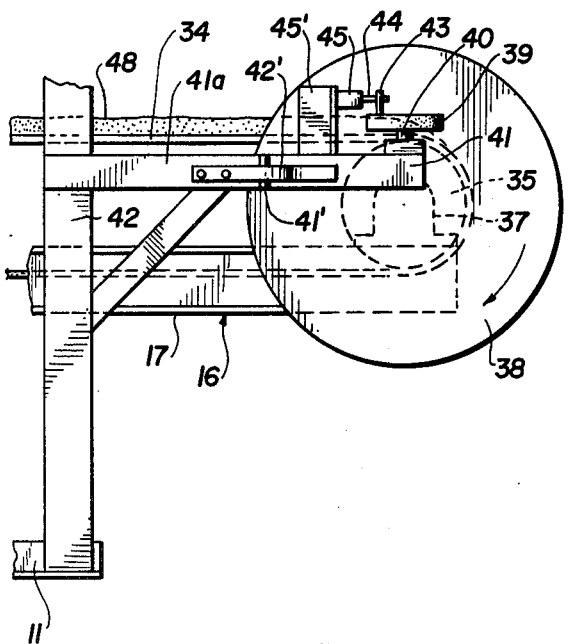
FIGS. 4 and 5 are fragmentary side elevational views on an enlarged scale, similar to FIG. 1, depicting the operation of the invention.
Figure 5:
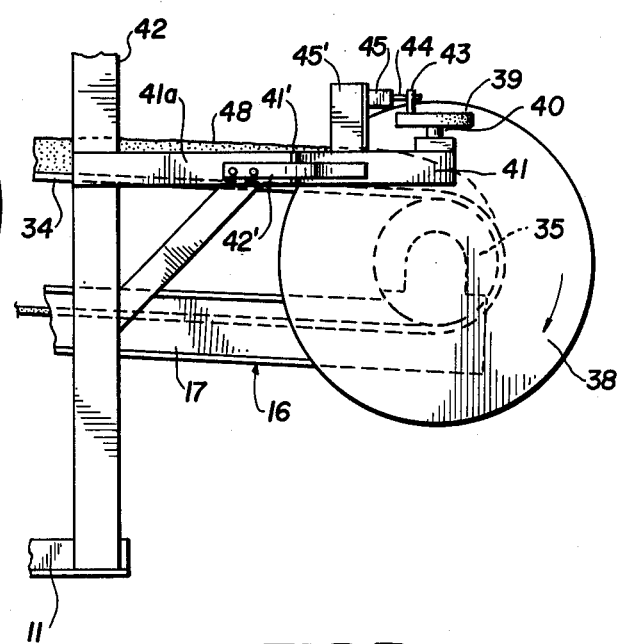

The simple mode of operation of the invention is best understood in connection with FIGS. 1, 4 and 5. In FIG. 1, there is no material on the conveyor belt 34 and the conveyor is in balance on the axis of the pivot shaft 15. When this condition prevails, the wheel 39 is at the neutral position on the center of the rotating disc 38 and no rotation is imparted to the wheel by the disc which is rotating in response to movement of the conveyor belt at a given speed under influence of the drive motor 20 and associated gearing. As previously noted, the conveyor speed and hence the capacity of the machine can be increased or decreased by changing pulley size or using variable diameter pulleys.

Referring to FIG. 4, when dry flowable material 48 is placed on the conveyor belt 34 above the pivot 15 and such material is transported forwardly by the belt toward the discharge end of the conveyor, the weight of this material will overcome the effect of the counterweights 19 and begin to tilt the discharge end of the frame 16 downwardly or clockwise about the axis of the shaft 15. This action causes the rotating disc 38 to descend relative to the wheel 39, FIG. 4, the wheel being at a fixed elevation on the standard 42 but held frictionally against the disc at all times, as described. As the disc 38 thus descends, it imparts rotation to the friction wheel 39 at an ever-increasing rate as a larger and larger effective circumference of the disc moves into driving contact with the wheel. The ultimate relative positions of the disc and wheel will depend on the amount and weight of the material 48 being transported. In any case, the induced rotation of the wheel 39 will cause its pin 43 to trip the microswitch actuator 44 (or the equivalent actuator of a mechanical counter) once during each revolution of the wheel to thereby advance the counter 46 one count. The machine is calibrated so that each revolution of the wheel 39 represents a unit of weight of the material, such as one pound. Therefore, with the belt continuously moving with any given amount of material 48 on it, the continuing rotation of the wheel 39 will automatically and continuously weigh and register on the counter 46 the weight of the material being conveyed to the discharge end of the conveyor where such material can be collected in any desired way.

FIG. 5 illustrates the operation when an increased weight of material 48 is placed on the conveyor near the pivot shaft 15 to further tilt the discharge end of the frame 16 downwardly, thus further lowering the disc 38 relative to the wheel 39 so that a larger diameter part of the disc is driving the wheel 39. The wheel is now turning at a faster rate and consequently in conjunction with the elements 43 and 44 an increased weight of material is being continuously and automatically registered on the digital counter 46 as the material is transported on the conveyor belt. The same mode of operation takes place for all relative positions of the disc 38 and wheel 39, and to this extent, the machine is infinitely self-adjusting between points of zero rotation of the wheel 39 to maximum rotation when the wheel is being driven by the largest diameter portion of the disc 38. In this manner, various types of flowable solids can be continuously and automatically weighed during transport on the conveyor to a point of discharge and collection. The speed and hence the capacity of the conveyor can be adjusted in the manner described.

It should be noted that it is unnecessary to place the material 48 on the belt 34 in a smooth uniform layer, as illustrated. When the material is irregular or has gaps therein, the conveyor will automatically rebalance itself and correct the relative positions of the disc 38 and wheel 39 to continuously and accurately weigh the material as it is being conveyed. As previously noted, the length of the conveyor forwardly of the pivot shaft 15 can be varied to meet particular needs. Similarly, the placement of the counterweights 19 can be changed from that illustrated in the drawings. For example, an overhead suspended pivot bar with counterweights thereon may be used, or other equivalent means.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. An automatic continuously weighing and registering conveyor comprising a supporting base, a conveyor frame tiltably mounted on the supporting base, an endless conveyor means on said frame including power drive and adjustable counterweighting means mounted near one end of said frame, a rotating disc directly driven by the endless conveyor means near the end of said frame which is remote from said power drive and counterweighting means, a coacting comparatively small diameter wheel on the supporting base and positioned at one side of the disc in a plane at right angles to the disc and being resiliently biased into frictional contact with the disc and driven in rotation by the disc in response to rotation of the latter, the rotational speed of said wheel varying with displacement of the disc due to tilting of the conveyor frame under load, and weight register means operatively engaged with said wheel.

2. An automatic continuously weighing and registering conveyor as defined in claim 1, and said endless conveyor means including an endless belt conveyor having a forward end roller directly coupled to said rotating disc, said power drive and adjustable counterweighting means being on the rear of said frame away from said disc and including a drive motor and gearing interconnecting the drive motor and a rear roller of the endless belt conveyor.

3. An automatic continuously weighing and registering conveyor as defined in claim 2, and a yielding retarder means coupled between the supporting base and said frame near the forward end of the frame and yieldingly resisting displacement of the forward end of the frame under loading.

4. An automatic continuously weighing and registering conveyor as defined in claim 1, and said weight register means comprising a digital counter having an actuator element in the path of rotation of a trip element on said wheel.

* * * * *